J. PORTEOUS.
TRACTION WHEEL.
APPLICATION FILED MAR. 18, 1913.
1,115,019.
Patented Oct. 27, 1914.
3 SHEETS—SHEET 1.
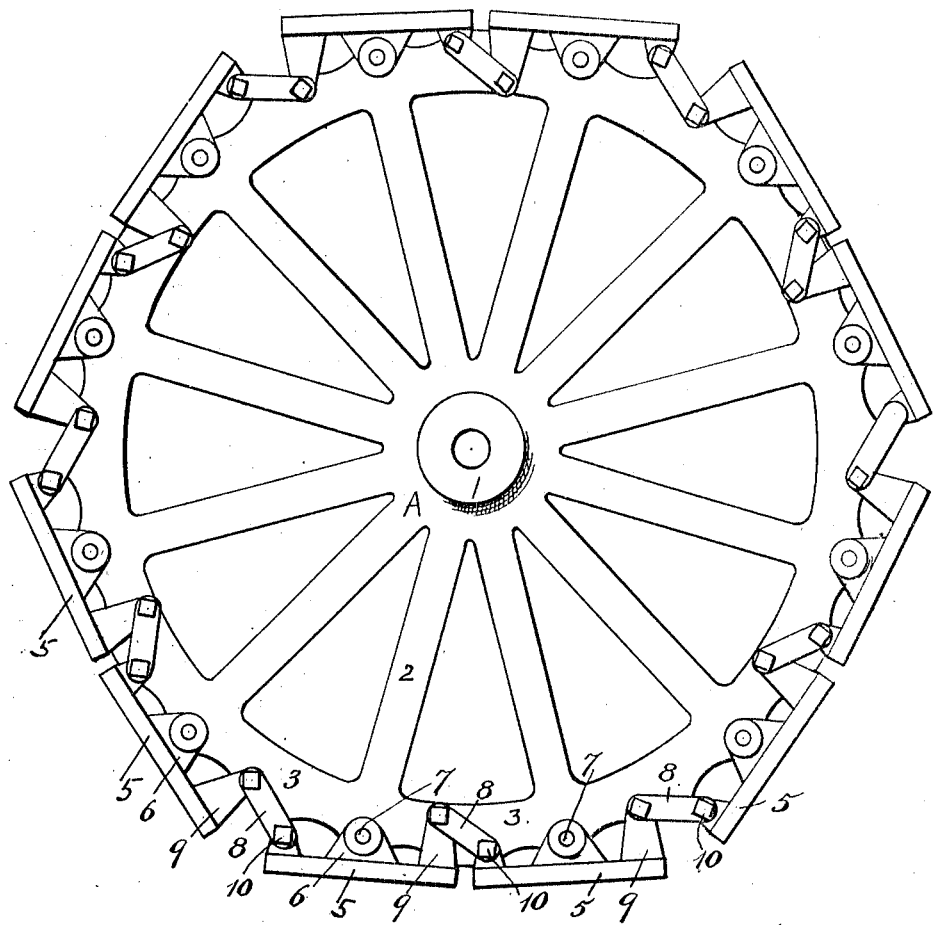
Fig. 1
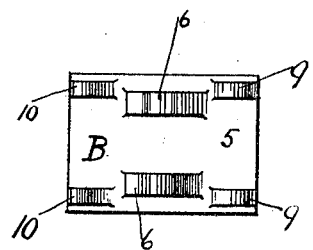
Fig. 4
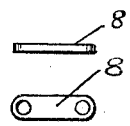
Fig. 11.
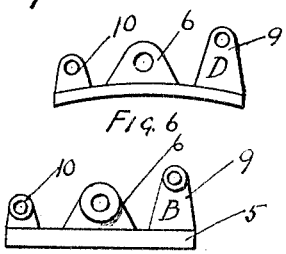
Fig. 6
Fig. 5
WITNESSES:
A. A. Huebner
Madge Buck.
INVENTOR.
James Porteous
BY
Francis C. Huebner,
ATTORNEY.

J. PORTEOUS.
TRACTION WHEEL.
APPLICATION FILED MAR. 18, 1913.

1,115,019.

Patented Oct. 27, 1914.
3 SHEETS—SHEET 2.

WITNESSES:

INVENTOR.
James Porteous
BY
Francis C. Huebner,
ATTORNEY.

J. PORTEOUS.
TRACTION WHEEL.
APPLICATION FILED MAR. 18, 1913.

1,115,019.

Patented Oct. 27, 1914.
3 SHEETS—SHEET 3.

WITNESSES:
A. A. Huebner
Madge Buck

INVENTOR
James Porteous
BY
Francis C. Huebner,
ATTORNEY

UNITED STATES PATENT OFFICE.

JAMES PORTEOUS, OF FRESNO, CALIFORNIA.

TRACTION-WHEEL.

1,115,019. Specification of Letters Patent. Patented Oct. 27, 1914.

Application filed March 18, 1913. Serial No. 755,068.

*To all whom it may concern:*

Be it known that I, JAMES PORTEOUS, a citizen of the United States, and a resident of the city of Fresno, county of Fresno, State of California, have invented a new and useful Improvement in Traction-Wheels, of which the following is a specification.

My invention relates to a device for keeping the wheels from slipping or sinking in soft ground, and consists of plates or shoes attached to the periphery of the wheel in such manner that the wheel will rest on one or more of said plates at all times during its revolution. Such plate is connected at each end with the adjoining plate so that when the wheel is rolling either forward or backward, and the center of gravity passes over the center of the plate where it is pivoted to the wheel, and an end of the plate approaches the bumper it will, being attached to the end of the plate adjoining it, force such plate to the common bumper at the same time.

Figure 2:
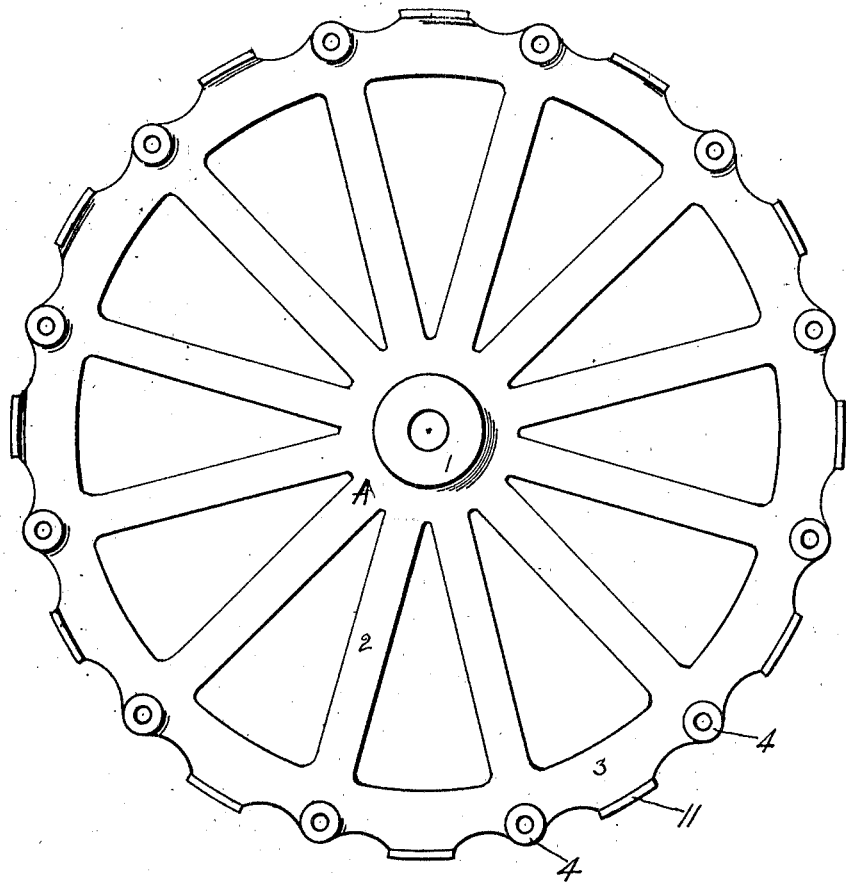
Figure 3:
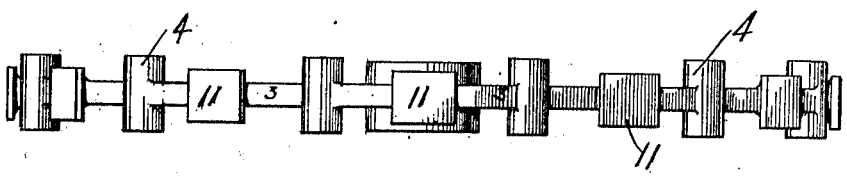
Figure 7:
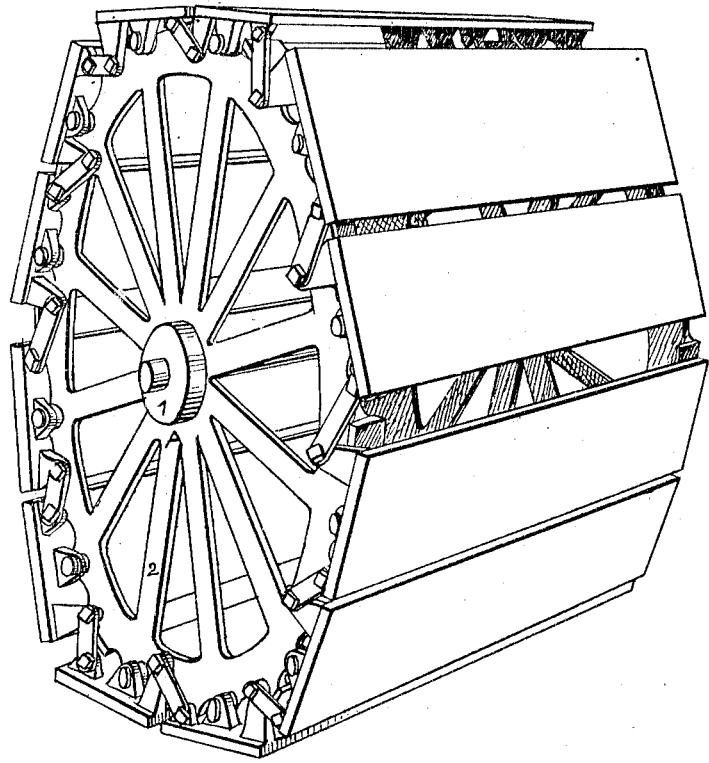
Figure 8:
Figure 9:
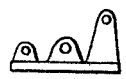
Figure 10:
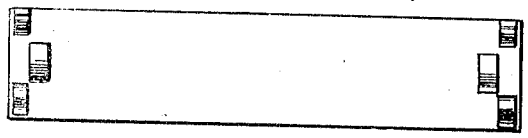

In the drawings which accompany this specification, Figure 1 is a side view of the wheel complete, Fig. 2 is a side view of the wheel with the shoes removed, Fig. 3 is a view of the periphery of the wheel, showing the hub, Fig. 4 is a top view of one form of shoe, which is pivoted to the periphery of the wheel, Fig. 5 is a side view of the form of shoe shown in Fig. 4 with a flat sole, Fig. 6 is a side view of the form of shoe shown in Fig. 4 with a concave sole, Fig. 7 is a drum wheel showing the shoes thereto attached, Fig. 8 is a side view of the shoe attached to the drum wheel shown in Fig. 7, Fig. 9 is an end view of Fig. 8, Fig. 10 is a top view of Fig. 8. Fig. 11 is a view of the connecting pin and links.

In said drawing, A is the wheel which can be constructed with an ordinary hub 1, and spokes 2. The rim 3 thereof is constructed with a plurality of transverse pivotal bearings 4, equidistant apart. In my construction I prefer to have such bearings opposite to or at the end of each spoke and to have them project so the center of the bearing is on line with the periphery of the wheel. At the pivotal bearings 4, I have increased the thickness of the rim to make such bearings more rigid. Midway between such contiguous pivotal bearings 4, I have constructed bumpers or rests 11 projecting uniformly on the periphery of the wheel.

In lieu of the wheel above described the hub and spokes may be utilized without the rim by constructing the pivotal bearings 4 and the bumpers 3 on the outside ends of alternate spokes, or an ordinary disk can be substituted, or two or more wheels can be hung from the same axle with the plates connecting the peripheries thereof as hereinafter described.

B is a shoe or plate the base of which is the same length as the distance between the centers of contiguous bumpers 11. Each is pivoted to the rim of the wheel at pivotal bearings 4. Shoe B is constructed with two uniform parallel upright pivotal bearing projections 6 running lengthwise on the upper side of said shoe one passing on either side of the rim as a convenient means for pivoting the shoe to rim. The pivot is shown as 7. For the purpose of running such wheels over uneven ground I have constructed such pivotal joints loosely. At the forward end on the upper side of said shoe B I have constructed twin upright posts 9 and at the opposite corners of such shoe, twin lugs 10. Posts 9 of one shoe are connected with lugs 10 of the adjoining shoe by means of a connection 8 pivoted to posts 9 near the top thereof, and pivoted to lugs 10 on the adjacent side of the next contiguous shoe. This connection should be pivoted to lug 10 nearer the base of the plate or shoe than where pivoted to post 9 and is of such length that the shoe has a movement on pivot 7 so it is possible for the adjoining ends of any two shoes to rest on their common bumper 11.

It will be noted that in certain positions of the wheel the plates, or the shoes are apparently in pairs; but as the center of gravity passes the pivotal center of any shoe on the ground such pairs are broken and changed as the wheel rolls. As the wheel rolls forward and the center of gravity passes pivotal joint 7 of the shoe resting on the ground and bumper 11 approaches the front end of said shoe, the point on post 9 where connection 8 is hinged changes its position relative to bumper 11, so as to bring the next forward shoe to which the other end of link 8 is hinged into a plane approximately parallel with the ground when the first named shoe rests on bumper 11 and as the center of gravity passes over pivot 7 of such succeeding shoe the same combination is repeated, thus forming a continuous track on which wheel A travels. It will be noted that in running the wheel backward the same result is accomplished of forming a track on which the wheel passes.

I have also used my said invention on drum wheels, constructing two disks or wheels of approximately the same diameter and have them connected with the shoes as shown in Figs. 8, 9 and 10. The construction of shoes as hereinbefore described permits the wheel to move backward as well as forward.

What I claim as my invention is:

1. In a wheel, the combination of a plurality of plates, each of which is rockingly pivoted at its approximately lateral center to the rim of such wheel, members connecting the adjacent ends of contiguous plates adapted to draw such connected plates on the under side of such wheel, as the wheel rolls either backward or forward, to a common plane.

2. In a wheel the combination of a plurality of bumpers equidistant apart on the periphery thereof, a plurality of plates equal to the number of such bumpers rockingly pivoted at the approximate lateral center thereof to the rim of the wheel midway between contiguous bumpers, upward projections at each end of each plate, members pivotally connecting such upward projections on adjacent ends of contiguous plates, such plates being adapted and arranged so the connected ends of connected plates can rest on the bumper between such connected plates, and such pivotally connecting members being adapted to force a reciprocating movement between such connected shoes, as such wheel rotates in either direction, all substantially as described.

3. In a wheel the combination of a plurality of bumpers equidistant apart on the rim thereof, an endless series of plates, each of such plates having projections on the upper side thereof at each end and in the middle, each of such plates being pivoted at the middle projection to the rim of the wheel midway between contiguous bumpers, and arranged so the adjacent ends of contiguous plates can rest on the bumper between such plates, links connecting the projections on the adjacent ends of contiguous shoes at a point nearer the base on the one projection than on the other, and adapted to force a pivotal movement at the middle of such plate as such wheel rolls, all substantially as described.

JAMES PORTEOUS.

Witnesses:
ERNEST KLATTE,
MADGE BUCK.

Copies of this patent may be obtained for five cents each, by addressing the "Commissioner of Patents, Washington, D. C."